July 3, 1928.
R. A. KLOCK ET AL
STORAGE BATTERY
Filed Dec. 23, 1922
1,675,978
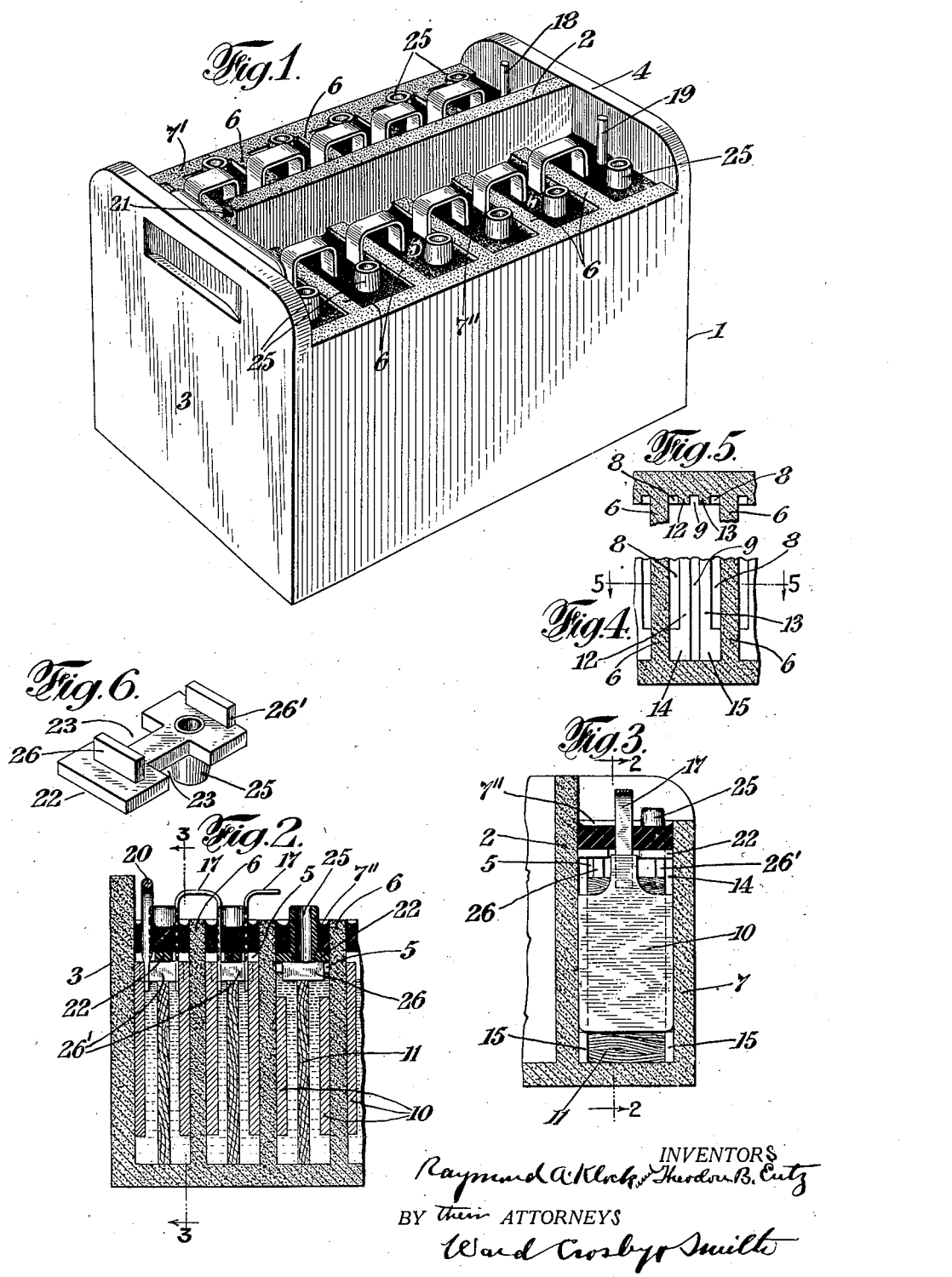

Patented July 3, 1928.

1,675,978

UNITED STATES PATENT OFFICE.

RAYMOND A. KLOCK, OF ROCKAWAY BEACH, AND THEODORE B. ENTZ, OF BROOKLYN, NEW YORK, ASSIGNORS, BY MESNE ASSIGNMENTS, TO GOULD STORAGE BATTERY COMPANY, INC., A CORPORATION OF NEW YORK.

STORAGE BATTERY.

Application filed December 23, 1922. Serial No. 608,607.

This invention relates to storage batteries, and more particularly to portable storage batteries for use as "B" batteries for wireless apparatus.

At the present time dry batteries are in general use as "B" batteries for wireless apparatus, and they are subject to the well known disadvantages of such batteries. The use of portable storage batteries for this purpose is desirable but there are objections to such batteries of known form for this field of work which requires a small, self-contained and inexpensive portable battery capable of maintaining an extremely constant terminal voltage, usually as high as about 24 volts and sometimes higher, for considerable periods of time during which, owing to the high resistance of the external circuit, the normal current is very feeble and should not suffer any material fluctuation due to local action in the battery. One objection to present types of storage batteries is that if made small and light enough to be handy and sufficiently cheap for the purpose and with the necessary number of cells, difficulties arise in maintaining them in proper condition. Another objection is the noise or interference frequently set up in a wireless system due to stray or leakage currents. This is due to the presence of more or less of the electrolyte on the surface of the sealing compound of the present types of portable batteries and around the terminals which acts as a conductor for stray currents from the terminals of one cell to those of another, which currents, even if so feeble as to be negligible in other work, set up objectionable interference or noise in the wireless system. Another difficulty encountered in the use of portable storage batteries of the present form for this purpose, is the difficulty of readily observing the level of the electrolyte in the battery by unskilled users since glass and celluloid containers are objectionable and the more suitable materials are opaque.

The present invention provides an inexpensive, small and compact portable storage, battery of sufficient capacity for this use, in which these and other difficulties and objections are overcome, thus providing a durable storage battery especially adapted for this field of use, where the battery is usually in the hands of inexperienced operators.

In the preferred embodiment of the invention as herein shown, we provide a plurality of rows of cell units arranged in a box or container which is provided with longitudinal and transverse partitions dividing it into individual cell compartments with covers sealed therein by means of a sealing compound; and these partitions project above the surface of the sealing compound so as to form obstructions above the sealing compound to the flow of stray currents along the surface of the compound from the terminals of one cell to those of another.

The invention consists in the novel features, arrangements and combinations of parts hereinafter described according to the preferred embodiment of the invention, and the invention will be more particularly pointed out in the appended claims.

Further objects, features and advantages of the invention will more fully appear from the following description taken in connection with the accompanying drawings illustrating the said preferred embodiment of the invention, and in which Fig. 1 is a perspective view of a storage battery embodying the invention;

Fig. 2 is a fragmentary longitudinal sectional view taken on line 2—2 of Fig. 3;

Fig. 3 is a fragmentary cross sectional view taken on line 3—3 of Fig. 2; and

Figs. 4, 5 and 6 show details.

Referring to the drawings, 1 is a liquid-tight container which in the present instance is made by molding from any suitable moldable non-conducting acid-resisting material, such for example as gummite. This container is provided with a longitudinal partition 2 extending between the end walls 3, 4 and fitting against the same, it being preferably molded with the box, of the same material and extending from the bottom of the box up to the top of the end walls, so as to firmly brace and strengthen the box or container and at the same time divide it into two liquid-tight compartments. These two longitudinal compartments are in turn divided into a plurality of individual cell compartments 5, 5, by means of partitions 6, 6, arranged transversely of the container one set of said partitions extending between one side wall 7 of the container and the longitudinal partition 2, and the other set of transverse partitions extending between the longitudinal partition and the other side wall of the container 7', the corresponding partitions 6, 6, on each side of the longitudinal partition 2 being arranged in alignment so as to constitute in effect transverse partitions extending from one side wall of the container to the other, except for the dividing longitudinal partition 2. These transverse partitions 6, 6 are also preferably molded integrally with the container, forming with the walls of the container and the longitudinal partition, individual liquid-tight cell compartments 5, 5. These transverse partitions 6, 6 extend to a height such that they project above the level of the sealing compound 7'' which seals the top of each compartment in known manner. In the preferred form of our invention, as shown in the drawings, the transverse partitions 6 are of the same height as the side walls 7 and 7', while the longitudinal partition 2 and the end walls 3 and 4 extend to a greater height for a purpose which will hereinafter appear. While in the present embodiment the container and the partitions are all molded as one integral device or unit it is within the scope of our invention, in its broader aspects, to form the structure of separate parts united in any suitable manner.

In each individual compartment the longitudinal partition and the side wall have oppositively facing grooves or guideways 8—8 and 9—9 formed therein, as shown in Figs. 3, 4 and 5, for receiving battery plates 10 and the separators or separator plates 11. These grooves are preferably formed by having on the walls of the longitudinal partition and on the side walls of the container, ridges or strips 12, 13. These ridges are preferably molded in place along with the container and partition as integral parts thereof. The strips 12 and 13 form, with the adjacent transverse partitions, grooves 8 for the battery plates, while the space between the two strips 12 and 13 forms the groove 9 for the separator or separator plate. It will be noted that the strips 12 and 13 have at their bottom ends lateral projections or shoulders 14—15 facing in opposite directions and serving as shoulders for terminating the grooves and supporting the battery plates elevated from the bottom of the container. However, the grooves 9 for the separator plates extend quite down to the bottom of the container so that the separator plates 11 rest on the bottom of the container and thus serve to prevent any active material which might fall from one of the plates from coming in contact with the other plate of a cell. Each separator however is spaced from the adjacent plates so that sediment or material dropping from the plates readily falls to the bottom. This may build up on the bottom of the cell until it contacts with its respective plate and electrically forms a part thereof and it will then function more or less actively as a part of the plate thus prolonging the life of the battery. The separator plates 11 also, due to impeding the flow of current through the electrolyte across the cell from one plate to the other, serve to increase the internal resistance of each cell, which is a desirable feature in a small battery of this kind, from which such a very minute current is required that this resistance has a negligible effect upon the normal operation of the battery but protects each cell by cutting down the current quite perceptibly, if the battery or any cells thereof be occasionally short-circuited by accident, or if the resistance of the external circuit be at times materially reduced during setting up of the system or making of adjustments, as are constantly made in practice. It is to be noted that this battery is used in a field which has been occupied by primary batteries, the utility of which is increased by the fact that they may be short-circuited for small intervals without appreciable damage, and users are apt to subject any battery used for the same purpose to substantially the same treatment as they have been accustomed to giving primary batteries, and thus seriously injure a storage battery or some other part of the equipment unless some provision for such treatment be made. Further, these batteries require such a small charging current that it is often desirable to charge them in multiple with other apparatus and, at such times, this internal resistance protects the cells against too high a charging rate upon small changes in the applied terminal voltage, such as are apt to take place. This feature, therefore, for the reasons stated, tends to prolong the life of the battery. In order to effectively perform these functions, it is important that these little separator plates be held down in position upon the bottom wall, and this is accomplished by engaging lugs 26, 26' on and extending downwardly from the individual covers 22 hereafter mentioned which lugs engage the tops of and hold down the separators.

The grooves 8 for the battery plates serve not only to keep the battery plates in their proper position, but also act to prevent warping or buckling of the battery plates during charging, in the event that they are too rapidly charged, as is very apt to be the case with a small battery of this type when charged along with other commercial batteries with the usual charging apparatus. These small batteries in the hands of inexperienced or careless users are liable to be infrequently charged, and when charged, are very apt to be placed in circuits carrying relatively heavy current which, unless the plates were secured on both sides, would likely result in the buckling of the plates. It will thus be noted that not only is each battery plate securely held in position and from warping or buckling, but each individual cell compartment is in effect divided into a positive and negative sub-compartment by means of the separator plates 11.

The battery plates of adjacent cells are connected by inverted U-shaped connections 17, and the end plates away from the battery terminals 18, 19, are connected by another inverted U-shaped conductor 20 extending through a slot 21 at the end of the longitudinal partition but spaced from the partition and the end wall of the container.

Each individual compartment is provided with a cover member 22 having intermediate cutaway portions 23 to enable the cover to be slipped in place over the battery conductors, and each cover in turn is provided with a vent tube 25 the upper end of which projects substantially above the cover and the sealing compound, so as to provide a substantial space in the tube to enable the electrolyte to expand during charging, and to avoid spilling in handling. The tops of these tubes may, if desired, be covered in any suitable manner, such for example as by a soft rubber bib slipped over the end of the tube or vent. It will be noted from the drawings, Figs. 2 and 3, that these vent tubes 25 are in alignment with the separator plates 11, and that the normal height of the electrolyte is above the top of the separator plates, so that by having the separator plates of a light or contrasting color, if one looks through the vent tube down onto the top edge of the separator plates, it can be readily determined whether the electrolyte has fallen below the desired height, depending upon whether one sees the liquid or the separator plate. This vent tube is preferably made integral with the cover, the cover and tube being molded in one piece out of suitable moldable non-conducting acid-resisting material, as shown in Fig. 6.

It will be observed from the foregoing that the construction described provides a relatively light and very compact portable storage battery which may have a large number of cells, so arranged and constructed as to withstand considerable rough handling without breakage, displacement or damage to the parts; the plates being kept in position and prevented from buckling, even if charged excessively, and the separators being held down to insure separate plate compartments. The electrolyte is not apt to slop out over the sealing compound, and even if it should, the projecting partitions will prevent a continuous spread of electrolyte from a terminal of one cell to one of another so as to permit the flow of stray currents which would set up undesirable noises in a wireless set. For this purpose it is particularly important to have the relatively high longitudinal partition or ridge 2 between the rows of cell terminals to prevent stray current flowing between terminals of relatively high differences of potential.

It will be noted that the partition 2 and the end walls 3, 4, by extending a considerable distance above the sealing compound and also above the partitions 6 and the side walls 7, 7', present large insulating surfaces which are readily cleaned in such manner that the resistance across the same may be maintained at a very high standard, which is very desirable since the greatest potential differences met in this type of battery occur between cells on opposite sides of the partition 2. Further, by having the partitions 6 and the side walls 7, 7' of the container all of the same height and lower than the partition 2 and end walls 3, 4, we produce a battery structure which is very easily cleaned, so as to prevent surface leakage, as the tops of the partitions 6 are all readily accessible and also the top edges of the sides 7 and 7' so that they may readily be wiped dry, while if the sides 7 and 7' and the partitions 6 were to extend to the height preferred for the end walls and partition 2 there would be formed deep pockets having square corners which would harbor moisture and conducting material and which could not be readily cleaned. Furthermore, we have given the connecting members 25 an arched form which affords sufficient clearance that the partitions 6 may be readily cleaned, and we have arranged the connectors so that they are protected from injury by the end walls and the partition 2. By arranging these connectors as shown and leaving proper portions without insulation we have adapted them to be readily used as intermediate taps to obtain any desired voltage, by one-cell steps, within the range of the battery.

While we have described our invention in detail in connection with the preferred embodiment of the same as shown in the drawings, it will be understood by those skilled in the art that various changes and modifications may be made therein without departing from the spirit or scope of the invention, and we do not wish to be understood as limiting ourselves other than as indicated in the appended claims.

Having thus described our invention, what we claim as new and desire to secure by Letters Patent, is:

1. In a storage battery, the combination of a container having therein a plurality of battery units, each unit comprising a positive and negative plate and electrolyte, a sealing compound sealing the tops of the units, a vent tube opening a substantial distance above said sealing compound, and partitions secured to and extending between opposite walls of the container and extending into the sealing compound and projecting above the level of the upper surface of the same so as to prevent leakage of the electrolyte from the terminals of a unit on one side of a partition to those on the other side.

2. In a storage battery, the combination of a container having therein a plurality of rows of battery units, each unit comprising a positive and negative plate and electrolyte, a sealing compound sealing the tops of the units, and a partition extending between the opposite walls of the container and extending from the floor of the container through the sealing compound and projecting above the level of the upper surface of the same so as to separate the rows of units on each side of the partition below the sealing compound and also to prevent above the sealing compound leakage of the electrolyte from the terminals of the units on one side of the partition to those on the other side.

3. In a storage battery, the combination of a molded container having end walls projecting well above the side walls, and having therein a plurality of rows of battery units, each unit comprising a positive and negative plate and electrolyte, a sealing compound sealing the tops of the units, and a partition molded with the container and extending between the opposite walls of the container and extending from the floor of the container through the sealing compound and projecting above the upper surface of the same so as to separate the container below the sealing compound into a plurality of liquid-tight compartments, and also to prevent above the sealing compound leakage of the electrolyte from the terminals of the cells on one side of the partition to those on the other side.

4. In a storage battery, the combination of a container having therein a plurality of rows of battery units, each unit comprising a positive and negative plate and electrolyte, a sealing compound sealing the tops of the units, a partition between the rows of units, extending between the end walls of the container and extending into the sealing compound and projecting above the upper surface of the same so as to prevent leakage of the electrolyte from the terminals of the units on one side of the partition to those on the other side, and lateral partitions between adjacent cells of each row also projecting upwardly from the sealing compound above the level of the upper surface of the same to prevent leakage of the electrolyte between the terminals of adjacent units of a row.

5. In a storage battery, the combination of a container having end walls projecting substantially above the side walls, and having therein a plurality of rows of battery units, each cell comprising a positive and negative plate and electrolyte, a sealing compound sealing the tops of the units, a partition between the rows of units secured to and extending between the end walls of the container and extending into the sealing compound and projecting above the upper surface of the same so as to prevent leakage of the electrolyte from the terminals of the cells on one side of the partition to those on the other side, and so as to brace and strengthen the container, and lateral partitions between adjacent units of each row extending from the first partition to the side walls of the container and secured thereto to brace and strengthen the container, and also extending into and projecting above the level of the upper surface of the sealing compound to prevent leakage of the electrolyte between the terminals of adjacent units of the rows.

6. In a storage battery, the combination of a container having therein a plurality of rows of battery units, each unit comprising a positive and negative plate and electrolyte, a sealing compound sealing the tops of the units, the end walls of the container extending well up above the sealing compound and side walls, and a longitudinal partition secured to and extending between the end walls of the container and extending through the sealing compound and projecting wall above the upper surface of the same, between the rows of terminals, to prevent leakage of the electrolyte from the terminals of one unit on one side of the partition to those on the other side.

7. In a storage battery, the combination of a container having partitions forming a plurality of rows of liquid-tight cell compartments, one of the partitions extending between the end walls of the container, and vertical grooves formed on said last partition and on the walls of the container parallel therewith for holding the battery plates in their relative positions in contact with the adjacent wall whereby the same are held from buckling during charging.

8. In a storage battery, the combination of a container having partitions forming a plurality of rows of liquid-tight cell compartments, one of the partitions extending between the end walls of the container, and vertical grooves formed on said last partition and on the walls of the container parallel thereto, the bottoms of said grooves terminating above the floor of the container and adapted to receive and hold the battery plates in position in contact with the adjacent wall and above the floor of the container.

9. In a storage battery, the combination of a container having partitions forming a plurality of rows of liquid-tight cell compartments, each cell comprising a positive and negative plate and electrolyte, one of the partitions extending between the end walls of the container, separator plates between the battery plates of each cell, and vertical grooves formed on said last partition and on the walls of the container parallel therewith, for receiving and holding the separator plates in position.

10. In a storage battery, the combination of a container having partitions forming a plurality of rows of liquid-tight cell compartments, each cell comprising a positive and negative plate and electrolyte, one of the partitions extending between the end walls of the container, separator plates between the battery plates of the individual cells, and grooves formed in the longitudinal partition and in the walls of the container parallel thereto and extending substantially to the floor of the container for holding said separator plates in position between the battery plates, each separator plate dividing its cell into positive and negative compartments and preventing active material which may fall from one plate from reaching the other.

11. In a storage battery, the combination of a container having partitions forming a plurality of rows of liquid-tight cell compartments, each cell comprising a positive and negative plate and electrolyte, one of the partitions extending between the end walls of the container, separator plates between the plates of each cell, and grooves formed in the longitudinal partition and in the container walls parallel thereto, for receiving respectively the battery plates and the separators for each cell, and adapted to hold said battery plates and separator plates each in position physically separated one from the other.

12. A molded storage battery container comprising end walls, side walls and bottom, and longitudinal and transverse partitions dividing the container into a number of individual liquid-tight cell compartments, and vertical grooves for receiving plates, formed on opposite walls of the individual cell compartments, the said walls, bottom, partitions and grooves all being one integral structure, and the end walls and the longitudinal partition extending well up above the side walls and lateral partitions.

13. In a storage battery, the combination with a battery cell comprising a positive and negative plate, electrolyte and containing walls, of a plurality of grooves on two opposite containing walls for receiving the two battery plates and holding them against the adjacent wall to prevent said plates from buckling during charge, and a groove on each of said opposite walls between the other two grooves for receiving and holding a separator.

14. In a storage battery the combination of a container having therein a plurality of battery units, each unit comprising positive and negative plates and electrolyte, a sealing compound sealing the tops of the units, partitions secured to and extending between opposite walls of the container and extending through and projecting above the top surface of the sealing compound, and connecting conductors connecting the positive and negative plates of adjacent units, said connectors comprising integral conducting strips passing up through the sealing compound and arched over the upper edges of said partitions.

15. In a storage battery the combination of a molded container with positive and negative plates and separators and electrolyte therein, and with grooves formed on two parallel upright walls of the container for receiving and holding the plates in position and with intermediate grooves formed in said walls for holding the separators in position.

16. In a storage battery the combination of a molded container with positive and negative plates and separators and electrolyte therein, the container having grooves molded on two parallel upright walls for receiving and holding the plates in position, said grooves only extending part way toward the bottom of the container whereby the lower edges of the plates are spaced from the bottom of the container, and said container also having intermediate grooves molded in said upright walls for holding the separators in position, said separators extending down to the bottom of the container.

17. A storage battery having a container, a positive and negative plate and electrolyte therein forming a storage battery cell, said plates being supported so that their bottom edges are substantially above the bottom of the container to provide a space below the bottom edges of the plates into which sediment may accumulate, and a separator between said plates and spaced therefrom, said separator extending from side to side of the cell and down to the bottom of the container to prevent the passage of sediment therebeneath.

18. A storage battery having a molded container with partitions molded therewith forming a plurality of cell compartments, a positive and negative plate and electrolyte in each compartment, and separators between the positive and negative plates respectively, the container having grooves formed in its upright walls for holding the plates in position and intermediate grooves in said walls for holding the separators in position.

19. A storage battery having a molded container with partitions molded therewith forming a plurality of cell compartments, a positive and negative plate and electrolyte in each compartment, and separators between the positive and negative plates respectively, the container having grooves formed in its upright walls for holding the plates in position and intermediate grooves in said walls for holding the separators in position, the separators being spaced from their adjacent plates and extending down to the bottom of the respective compartments to prevent the passage of sediment thereunder.

20. A storage battery having a molded container with partitions molded therewith forming a plurality of cell compartments, a positive and negative plate and electrolyte in each compartment, and separators between the positive and negative plates respectively, the container having grooves formed in its upright walls for holding the plates in position and intermediate grooves in said walls for holding the separators in position, the separators being spaced from their adjacent plates and extending down to the bottom of the respective compartments to prevent the passage of sediment thereunder, and the plates being supported with their bottom edges materially above the bottom of the compartments.

21. A storage battery comprising a container having side walls, end walls, a bottom, a longitudinal partition and a plurality of transverse partitions forming a plurality of rows of individual compartments for containing storage battery elements, the side walls and transverse partitions of said compartments being of substantially uniform height so that the upper edges thereof may be readily cleaned, and the longitudinal partition and end walls extending above the transverse partitions and exposing readily cleanable insulating surfaces above the same.

22. A storage battery comprising a container having side walls, end walls, a bottom, a longitudinal partition and a plurality of transverse portions all cooperating to form a plurality of rows of liquid-tight compartments, storage battery elements in said compartments, the side walls and transverse partitions of said compartments being of substantially uniform height so that the upper edges thereof may be readily cleaned, and connectors between adjacent cells and spaced from the partitions to allow cleaning spaces between the connectors and the transverse partitions, said longitudinal partition and end walls extending above the side walls and transverse partitions and presenting readily cleanable surfaces insulating the rows of cells from each other and protecting the connectors from exposure to injury.

23. In a storage battery, a container having a longitudinal partition and a plurality of transverse partitions forming a plurality of rows of liquid-tight compartments, storage battery elements in said compartments and means for closing the tops of said compartments forming a liquid-tight joint with said partitions, said transverse partitions extending above the closing means to prevent moisture on the tops of said closing means of one compartment from spreading to another, said longitudinal partition extending above the closing means and the transverse partitions to prevent moisture on top of the closing means and partitions on one side thereof from reaching the other side and presenting an exposed insulating surface above the transverse partitions which may readily be wiped free of any moisture thereon.

24. In a storage battery, a container having a longitudinal partition and a plurality of transverse partitions forming therein a plurality of rows of liquid-tight compartments, storage battery elements in said compartments, sealing compound closing the tops of said compartments and forming a liquid-tight joint with said partitions, connectors for the cells passing through the sealing compound and forming a liquid-tight joint therewith, said connectors being operatively connected with the elements of the cells below said sealing compound and arched over the transverse partitions above the compound so as to leave a clearance space therebtween for readily cleaning the tops of said partitions, said longitudinal partition extending above the transverse partitions and exposing a readily cleanable insulating surface above the same to prevent moisture on one side thereof communicating with the other.

25. A storage battery for supplying feeble current throughout long intervals comprising cells of relatively large capacity and separator means whereby relatively great excess above the normal output is prevented by increasing the internal resistance of each cell of said battery in a measure of protective value but causing negligible interference with the normal operation thereof.

26. In a storage battery, the combination of a molded container with positive and negative plates, separators and electrolyte therein, the container having grooves formed on two parallel upright walls for receiving and holding the plates in position, said container also having intermediate grooves formed on said wall for holding the separators in position, said separators extending down to the bottom of the container to prevent the passage of sediment therebeneath.

27. A storage battery, comprising an integral box having a bottom and the side walls of a cell, two opposite side walls having guide tongues projecting inward therefrom to provide slideways between them and the other pair of side walls, battery plates removably mounted in said slideways, a cover plate arranged to rest on the upper ends of said tongues, said cover plate being provided with an upwardly projecting filling tube, and sealing compound resting upon said cover plate and surrounding said tube.

28. A storage battery, comprising an integral box having a bottom and the side walls of a cell, two opposite side walls having guide tongues projecting inward therefrom to provide slideways between them and the other pair of side walls, battery plates removably mounted in said slideways, and a cover plate arranged to rest on the upper ends of said tongues, said cover plate being provided with an upwardly projecting filling tube.

29. A storage battery, comprising an integral box having a bottom and the side walls of a cell, two opposite side walls having guide tongues projecting inward therefrom to provide slideways between them and the other pair of side walls, battery plates removably mounted in said slideways, and a cover plate arranged to rest on the upper ends of said tongues, said cover plate being provided with an upwardly projecting filling tube integral with said cover plate.

30. A storage battery, comprising an integral box having a bottom and the side walls of a cell, two opposite side walls having guide tongues projecting inward therefrom to provide slideways between them and the other pair of side walls, battery plates removably mounted in said slideways, and a cover arranged to rest on the upper ends of said tongues, said battery plates being provided with upwardly projecting fingers, and said cover plate being provided with notches for receiving said fingers and with an upwardly projecting filling tube.

31. A storage battery, comprising an integral box having a bottom and the side walls of a cell, two opposite side walls having guide tongues projecting inward therefrom to provide slideways between them and the other pair of side walls, battery plates removably mounted in said slideways, and a cover arranged to rest on the upper ends of said tongue, said battery plates being provided with upwardly projecting fingers, and said cover plate being provided with notches for receiving said fingers and with an upwardly projecting filling tube, said filling tube being out of the line of said notches.

32. A battery box made as an integral piece of molded insulation, and having a bottom and end and side walls, said battery box also having an integral longitudinal partition parallel to the side walls and integral transverse partitions parallel to the end walls to divide the box into a purality of rows of cells, the longitudinal partition being higher than the transverse partitions.

In testimony whereof we have signed our names to this specification.

RAYMOND A. KLOCK.
THEODORE B. ENTZ.